United States Patent
Liu et al.

(10) Patent No.: US 8,714,030 B1
(45) Date of Patent: May 6, 2014

(54) NON-INVASIVE TRANDUCERS FOR ULTRASONIC TRANSIT TIME FLOW METERS

(75) Inventors: LingLi Liu, New Haven, CT (US); Frederick E. Jackson, Wethersfield, CT (US)

(73) Assignee: Strain Measurement Devices, Inc., Wallingford, CT (US)

( * ) Notice: Subject to any disclaimer, the term of this patent is extended or adjusted under 35 U.S.C. 154(b) by 173 days.

(21) Appl. No.: 13/229,674

(22) Filed: Sep. 10, 2011

(51) Int. Cl.
*G01F 1/66* (2006.01)

(52) U.S. Cl.
USPC ........................................................ 73/861.28

(58) Field of Classification Search
USPC ........................................ 73/861.28, 861.27
See application file for complete search history.

(56) References Cited

U.S. PATENT DOCUMENTS

| | | | | |
|---|---|---|---|---|
| 4,454,767 A * | 6/1984 | Shinkai et al. | ............. | 73/861.18 |
| 5,179,862 A | 1/1993 | Lynnworth | ................ | 73/861.28 |
| 5,594,181 A | 1/1997 | Stange | ........................ | 73/861.28 |
| 5,974,897 A | 11/1999 | Koyano et al. | ............. | 73/861.28 |
| 6,055,868 A * | 5/2000 | Koyano et al. | ............. | 73/861.28 |
| 6,681,642 B2 * | 1/2004 | Ohkawa | ...................... | 73/861.27 |
| 7,270,014 B2 * | 9/2007 | Keese et al. | ................ | 73/861.12 |
| 7,360,448 B2 * | 4/2008 | Maginnis et al. | .......... | 73/861.27 |
| 7,469,598 B2 | 12/2008 | Shkarlet et al. | ............ | 73/861.18 |

OTHER PUBLICATIONS

Krause, Ultrasonic Flow-meter and the Acoustic Waveguide in a Moving Medium, Proceedings of the COMSOL Users Conference 2007 Genoble.

* cited by examiner

*Primary Examiner* — Jewel V Thompson
(74) *Attorney, Agent, or Firm* — Fattibene and Fattibene LLC; Paul A. Fattibene

(57) ABSTRACT

An ultrasonic flow meter permitting easy insertion and removal of a tube or conduit. A partial ring transducer or partial cylinder transducer is used to permit easy insertion and removal of a flexible tube in an ultrasonic flow meter for measuring fluid flow. In another embodiment a split ring or split cylinder transducer is used to facilitate easy removal and insertion of a tube or conduit in which fluid flow is to be measured. In another embodiment a clamping system is used to securely hold and couple a tube or conduit within the ultrasonic flow meter system. The present invention is conveniently adapted to hold flexible tubes and in particular disposable flexible tubes often used in the medical industry.

17 Claims, 6 Drawing Sheets

NON-INVASIVE TRANDUCERS FOR ULTRASONIC TRANSIT TIME FLOW METERS

FIELD OF THE INVENTION

The present invention relates in general to ultrasonic flow meters used to measure fluid flow in tubes or conduits, and more particularly to an ultrasonic transducer system permitting easy insertion of flexible tubes.

BACKGROUND OF THE INVENTION

The use of ultrasonic transducers to measure fluid flow is well-known. One such flow meter is disclosed in U.S. Pat. No. 5,594,181 entitled "Ultrasonic Flow Meter" and issuing to Stange on Jan. 14, 1997. Therein disclosed is an ultrasonic flow meter having two ring-shaped piezoelectric transducers with one operating as an ultrasonic transmitter and the other one as an ultrasonic receiver. The two ring-shaped piezoelectric transducers are embedded into the wall of a pipe.

Another ultrasonic flow meter is disclosed in U.S. Pat. No. 5,974,897 entitled "Ultrasonic Flow Meter" and issuing to Koyano et al on Nov. 2, 1999. Therein disclosed is an ultrasonic flow meter having three ring-shaped oscillators disposed longitudinally along a tube so as to intimately contact the inner peripheral surface of the ring-shaped oscillators with the outer peripheral surface of the tube. The center oscillator generates an ultrasonic wave that is detected by the forward and rearward oscillators to obtain the flow rate of a fluid flowing through the tube.

Yet another flow meter is disclosed in U.S. Pat. No. 6,055,868 entitled "Ultrasonic Flow Meter" and issuing to Koyano et al on May 2, 2000. Therein disclosed is an ultrasonic flow meter with two ring-shaped oscillators disposed longitudinally along the tube.

While these ultrasonic flow meters have adequately measured fluid flow they have been difficult to use in many applications, particularly where different sizes of tubes are used and where there is a need to frequently replace tubes. Accordingly, efforts have been made to accommodate different sizes of tubes or to facilitate the replacement of tubes in an ultrasonic flow meter. One such system is disclosed in U.S. Pat. No. 5,179,862 entitled "Snap-On Flow Measurement System" and issuing to Lynnworth on Jan. 19, 1993. Therein disclosed is a block having a channel therein and a retaining pin. Also disclosed therein is a semi-rigid body having a keyhole slot. The block or body is used to hold a conduit adjacent a transducer block. Another device for accommodating a conduit is disclosed in U.S. Pat. No. 7,469,598 entitled "Method of Employing a Transit Time Ultrasound Sensor" issuing to Shkarlet et al on Dec. 30, 2008. Therein disclosed is a measuring channel having an acoustic couplant contained therein for retaining a conduit in the measuring channel.

While these devices have adequately held a tube or a conduit or permitted their replacement, they have often encountered problems of coupling the ultrasonic transducer to the tube and fluid flow therein to obtain strong signals utilized for measuring the fluid flow. Therefore there is a need for an ultrasonic flow meter system that can accommodate tubing easily and yet permit the easy replacement of the tubing and in particular tubing that may be flexible and disposable tubing such as that used in medical applications in which the tubing is disposed of after each use.

SUMMARY OF THE INVENTION

The present invention comprises an ultrasonic flow meter system in which tubing can be easily inserted and removed, facilitating the use of a flexible disposable tube often used in the medical field to transport fluids into or out of the body. The ultrasonic flow meter comprises a plurality of partial ring transducers that have an opening for insertion of a flexible tube. In another embodiment the ultrasonic transducer comprises a split-ring transducer having ring segments that may be placed together holding a tube. In yet another embodiment an ultrasonic flow meter comprises a partial ring transducer having a clamp contacting the tube at the opening formed in the partial ring transducer. The partial ring or split ring transducers permit easy insertion and removal of a tube or conduit in which fluid flow is to be measured and yet permits good coupling of the ultrasonic energy from the partial ring or split ring transducer to the tube or conduit.

Accordingly, it is an object of the present invention to provide an ultrasonic flow meter that permits a tube or conduit to be easily inserted and removed.

It is a further object of the present invention to provide an ultrasonic flow meter that provides good coupling to the tube or conduit for measuring fluid flow therein.

It is an advantage of the present invention that the ultrasonic flow meter can accommodate flexible tubes that may be made readily disposable.

It is another advantage of the present invention that flexible tubing commonly used in the medical field may be used.

It is a feature of the present invention that a partial ring transducer is used.

It is another feature of the present invention that a split ring transducer is used.

It is yet another feature of the present invention that a partial ring or split ring transducer is driven radially.

It is a further feature of the present invention that a partial cylinder or split cylinder transducer is driven axially.

It is yet another feature of the present invention that a clamp is used in combination with a partial ring transducer for holding the tube and providing good coupling.

These and other objects, advantages, and features will become more readily apparent in view of the following more detailed description.

DETAILED DESCRIPTION OF THE PREFERRED EMBODIMENTS

Figure 1:
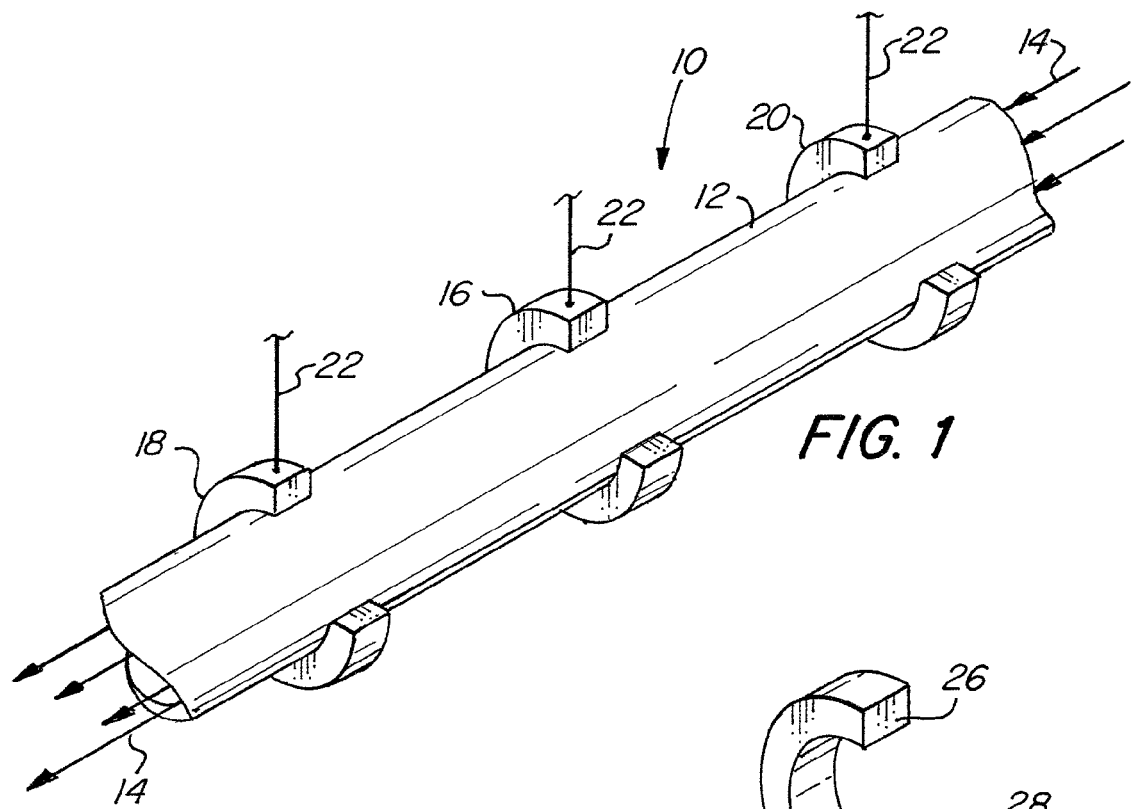
FIG. 1 is a perspective view illustrating an ultrasonic flow meter of the present invention using three partial ring transducers.

FIG. 1 is a perspective view illustrating an ultrasonic flow meter of the present invention. The ultrasonic flow meter 10 holds a soft or flexible tube 12 having a fluid flow moving in the direction of arrows 14. The tube 12 may be made of polyvinyl chloride or PVC, silicone, or other soft or flexible material. A plurality of partial ring transducers 16, 18 and 20 are placed around the tube 12. Each of the plurality of partial ring transducers are coupled through a wire or conductor 22 to a controller containing electronics, not shown, for controlling the transmission and reception from the plurality of transducers 16, 18 and 20. The center partial ring transducer 16 may act as a transmitter with the upstream partial ring transducer 18 and the downstream partial ring transducer 20 acting as receivers. The plurality of partial ring transducers may be made of a piezoelectric material, such as lead zirconate titanate or PZT, or other materials with piezoelectric properties.

Figure 2A:
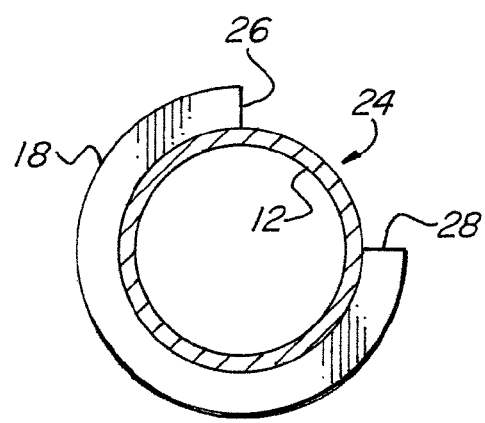
FIG. 2A is a partial cross section of a partial ring transducer holding a tube or conduit.
Figure 2B:
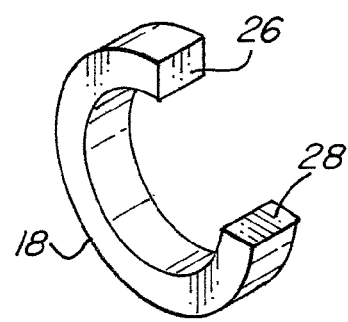
FIG. 2B is a perspective view illustrating a partial ring transducer.
Figure 2C:
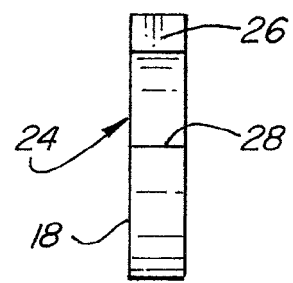
FIG. 2C is an elevational view illustrating a partial ring transducer.

FIGS. 2A-C more clearly illustrates one of the partial ring transducers. FIG. 2A is a partial cross section illustrating the partial ring transducer 18 holding the tube 12. The tube 12 is inserted into the partial ring transducer 18 through the opening 24 formed by a first end 26 and a second end 28. The opening 24 is preferably less than one hundred and eighty degrees of the circumference of the partial ring 18 and it is preferably between sixty and ninety degrees of the circumference. The opening 24, illustrated in FIG. 2A, is approximately ninety degrees of the circumference. FIG. 22 is a perspective view more clearly illustrating the shape and the two ends 26 and 28 of the partial ring transducer 18. FIG. 2C additionally illustrates the two ends 26 and 28 between the opening 24 in the partial-ring transducer 18.

Figure 3:
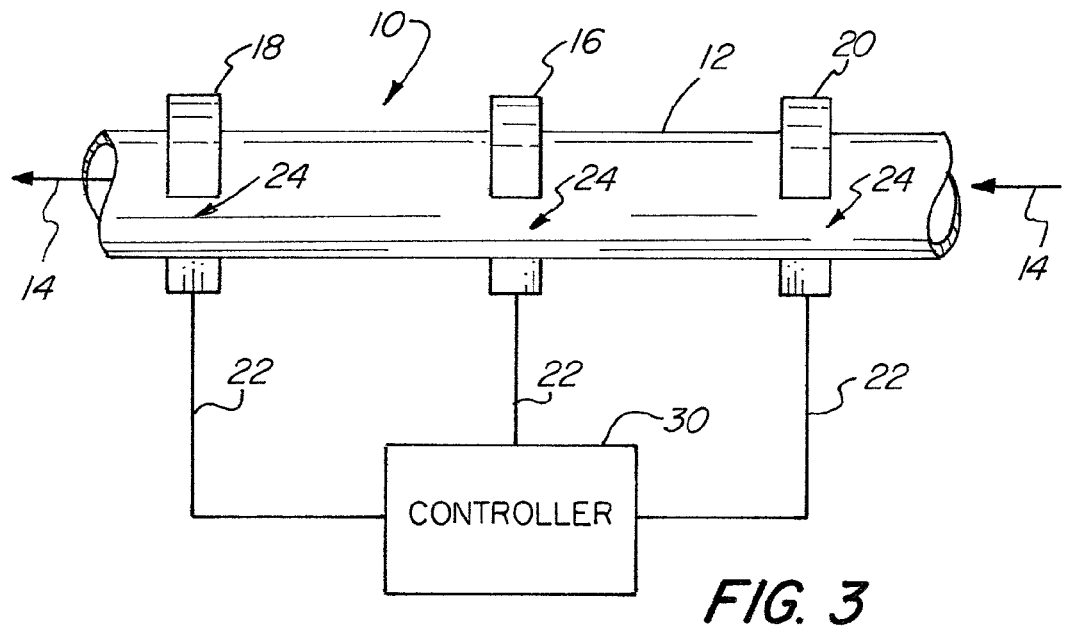
FIG. 3 schematically illustrates an ultrasonic flow meter system using three partial ring transducers.

FIG. 3 schematically illustrates the ultrasonic flow meter 10 with the plurality of partial-ring transducers 16, 18 and 20 coupled to a controller 30. The controller 30 may control the plurality of partial ring transducers 16, 18 and 20 so as to drive the central partial ring transducer 16 as a transmitter forming an ultrasonic wave within the fluid contained in tube or conduit 12 to the upstream partial ring transducer 18 and the downstream partial ring transducer 20 that act as receivers. The time difference or time lag between the received signal at the upstream partial ring transducer 18 and the downstream partial ring transducer 20 is proportional to the fluid flow in tube 12, represented by arrows 14. Accordingly, the controller 30 may operate similarly to the operation of the ultrasonic flow meter disclosed in U.S. Pat. No. 5,974,897, which is herein incorporated by reference.

Figure 4:
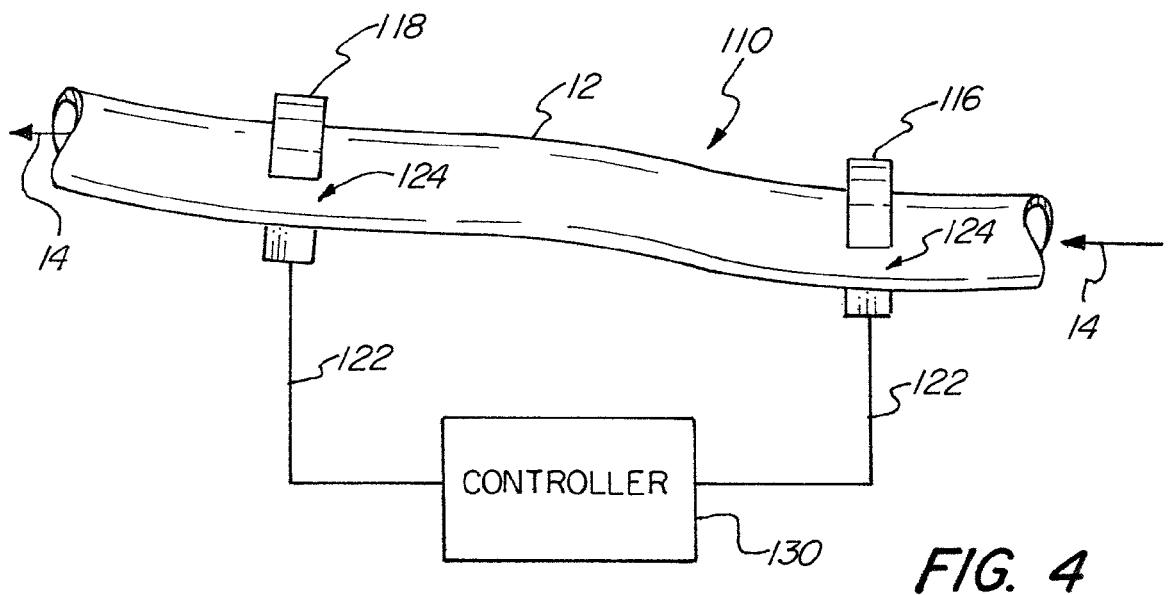
FIG. 4 schematically illustrates an ultrasonic flow meter system using two partial ring transducers.

FIG. 4 illustrates another embodiment of an ultrasonic flow meter 110 utilizing two partial ring transducers 116 and 118 coupled through wires or conductors 122 to a controller 130. The fluid flow represented by arrows 14 may be measured by driving the two partial ring transducers similar to that as disclosed in U.S. Pat. No. 6,055,868, which is herein incorporated by reference.

Figure 5:
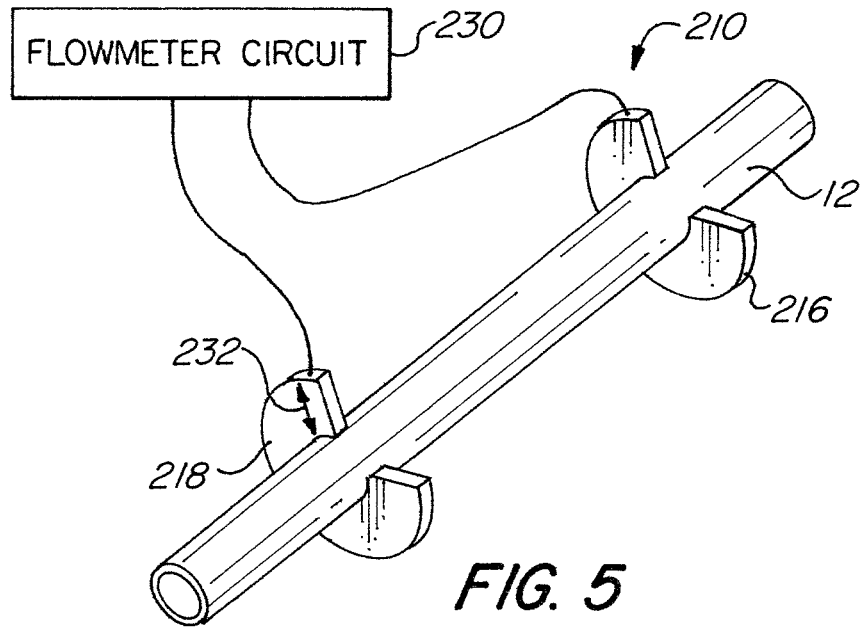
FIG. 5 is a perspective view schematically illustrating an ultrasonic flow meter system utilizing two partial ring transducers that are driven radially.

FIG. 5 illustrates another embodiment of the present invention wherein the ultrasonic flow meter 210 comprises two partial ring transducers 216 and 218 holding the tube or conduit 12. The two partial ring transducers 216 and 218 are driven by a flow meter circuit 230. The flow meter circuit 230 preferably drives the partial ring transducers 216 and 218 so they vibrate radially causing a wave to travel within the fluid in the tube 12. The radially driving of the two partial ring transducers 218 and 216 causes an ultrasonic wave to propagate initially radially and then axially within the tube 12. Arrow 232 represents the direction of radial vibration of the partial ring transducers 216 and 218.

Figure 6:
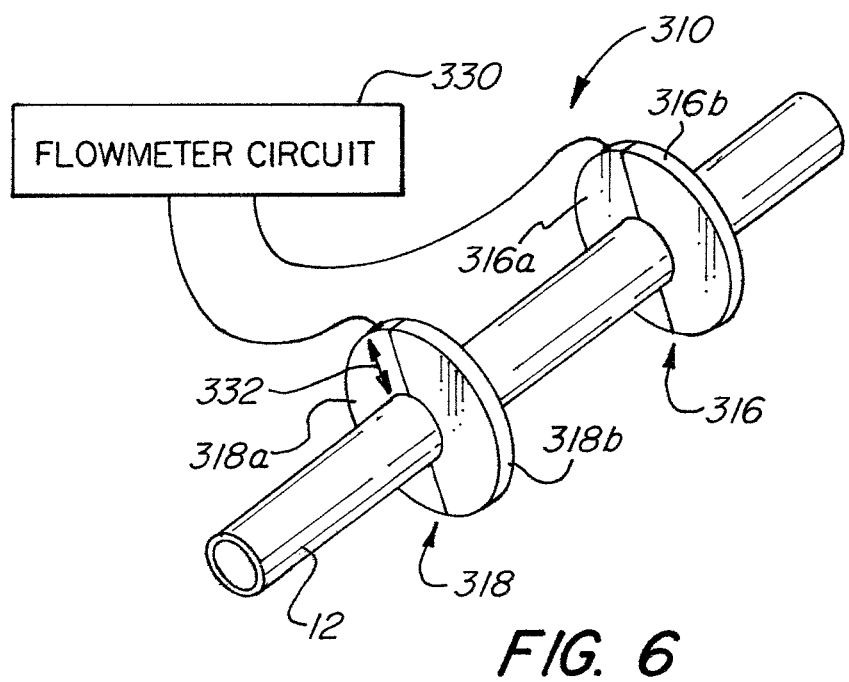
FIG. 6 is a perspective view schematically illustrating an ultrasonic flow meter system utilizing two split ring transducers driven radially.

FIG. 6 illustrates an embodiment of the invention utilizing two split ring transducers. This embodiment may be used to hold more rigid pipe or tubing, such as made from polytetrafluoroethylene or PTFE, glass, or steel. The ultrasonic flow meter 310 comprises two split ring transducers 316 and 318 that are assembled around the tube 12 in two halves. Split ring transducer 316 is comprised of a first half 316a and a second half 316b and split-ring transducer 318 is comprised of a first half 318a and a second half 318b. The halves are placed together to securely hold the tube or conduit 12. While two halves are illustrated in FIG. 6, multiple segments may be used to form the split ring transducer and to hold the tube or conduit 12 when assembled. The use of a split ring permits the tube or conduit 12 to be easily removed and replaced in the ultrasonic flow meter 310. The split ring transducers 316 and 318 are driven by a flow meter circuit 330 similarly to that described with respect to FIG. 5. Arrow 332 represents the direction of radial vibration of the split ring transducers 316 and 318.

Figure 7:
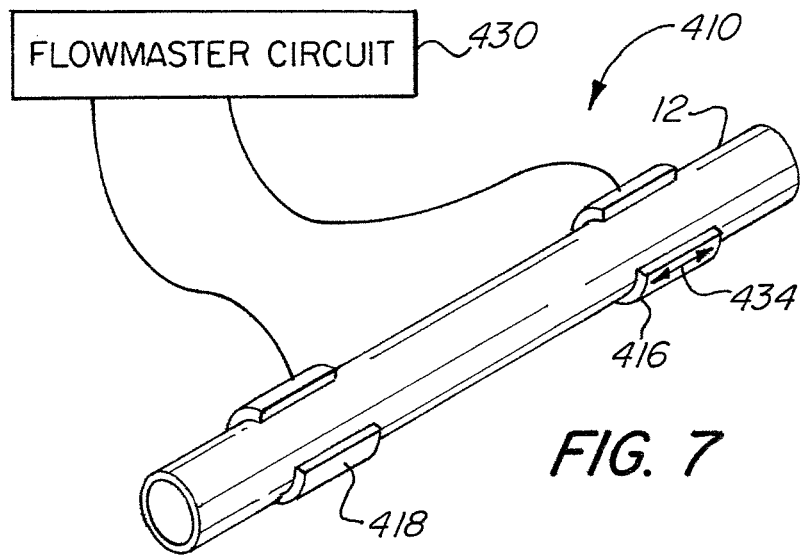
FIG. 7 is a perspective view schematically illustrating an ultrasonic flow meter system utilizing two partial cylinder transducers driven axially.

FIG. 7 illustrates yet another embodiment of the present invention utilizing an axially driven transducer. Ultrasonic flow meter 410 comprises partial cylinder transducers 416 and 418 holding the tube or conduit 12 and driven by a flow meter circuit 430. The flow meter circuit 430 drives the partial cylinder transducers 416 and 418 at a certain frequency so they vibrate axially as represented by arrow 434. The axial driving of the partial cylindrical transducers 416 and 418 provide a positive wave transmission improving the detection of the fluid flow within the tube or conduit 12.

Figure 8:
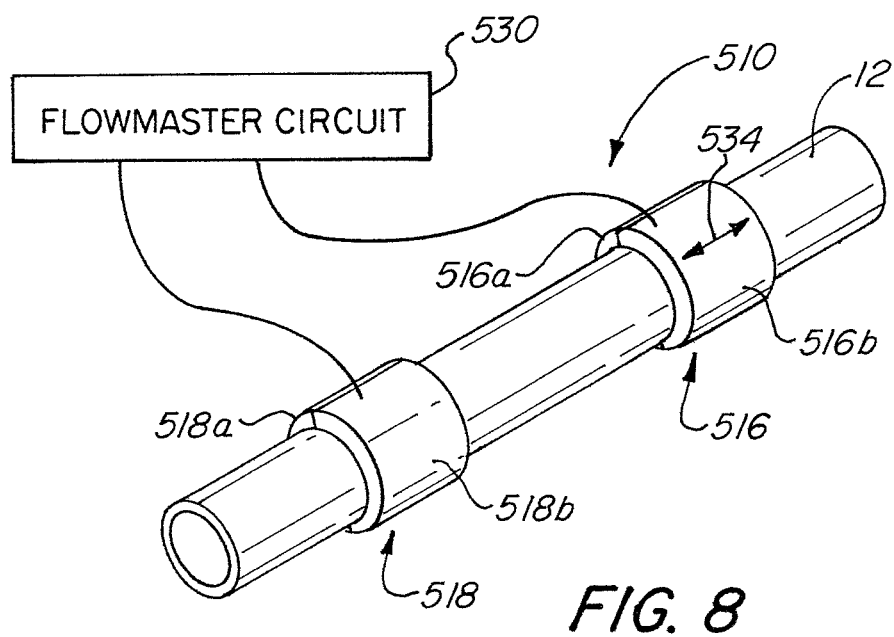
FIG. 8 is a perspective view schematically illustrating an ultrasonic flow meter system utilizing two split cylinder transducers driven axially.

FIG. 8 illustrates yet another embodiment of the present invention in which the ultrasonic transducers are driven axially. Ultrasonic flow meter 510 comprises split-cylinder transducers 516 and 518. Split cylinder transducer 516 is comprised of a first half cylinder 516a and a second half cylinder 516b and split cylinder transducer 518 is comprised of a first half cylinder 518a and a second half cylinder 518b. By utilizing split cylinder transducers 516 and 518 the tube or conduit 12 can readily be removed from the ultrasonic flow meter 510. The flow meter circuit 530 drives the split cylinder transducers 516 and 518 axially as represented by arrow 534.

Figure 9:
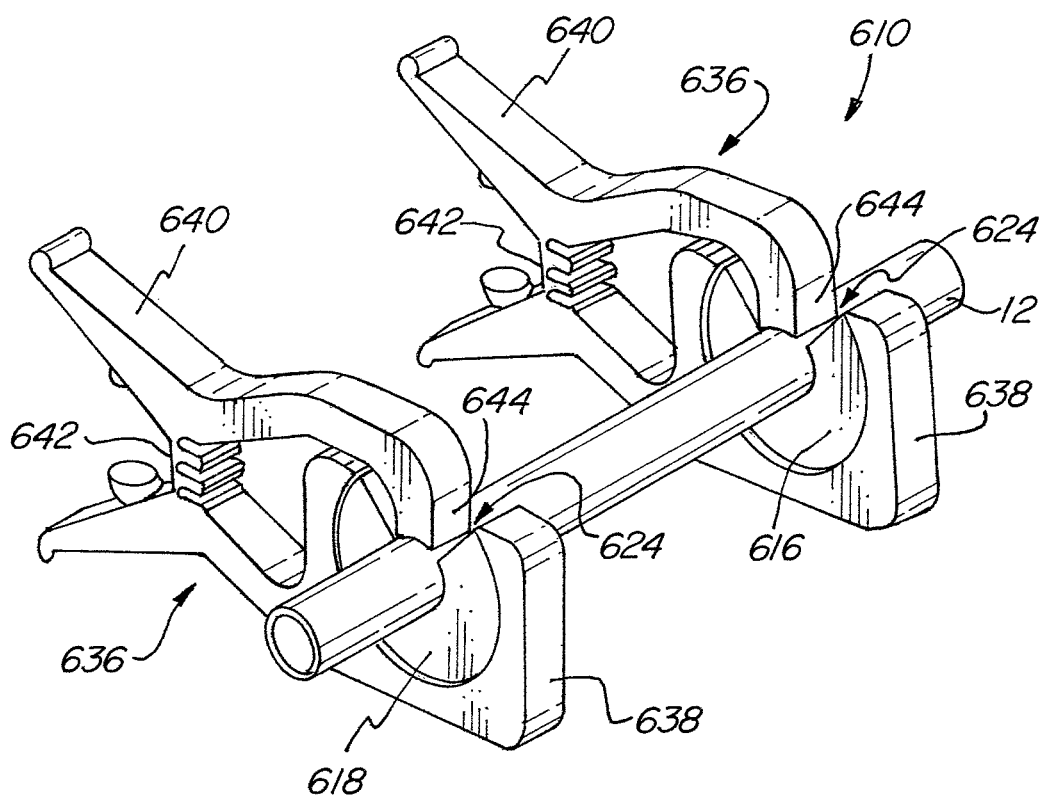
FIG. 9 is a perspective view illustrating an ultrasonic flow meter system utilizing two partial ring transducers and a clamp.

FIG. 9 is a perspective view of another embodiment of the present invention utilizing a clamp. The ultrasonic flow meter 610 comprises partial ring transducers 616 and 618 holding a tube or conduit 12 when placed through the opening 624 formed by the split ring transducers 616 and 618. A housing 638 is formed around the partial ring transducers 616 and 618 and is formed as part of a clamp 636. The clamp 636 has a lever or handles 640 coupled to a spring hinge 642. The spring hinge 642 provides a predetermined amount of force. A tube support 644 is placed adjacent the opening 624 and contacts the tube or conduit 12 so as to improve coupling between the partial ring transducers 616 and 618 and the tube or conduit 12. Accordingly the tube or conduit 12 can easily be removed when desired and replaced within the ultrasonic flow meter 610 by pressing on lever or handle 640 so as to lift the tube support 644 off of and away from the tube or conduit 12 permitting the tube or conduit 12 to be easily removed through the openings 624 formed in the partial ring transducers 616 and 618. The use of the tube support 644 assures that the tube 12 stays in position and improves the coupling providing an improved signal representative of fluid flow.

Figure 10:
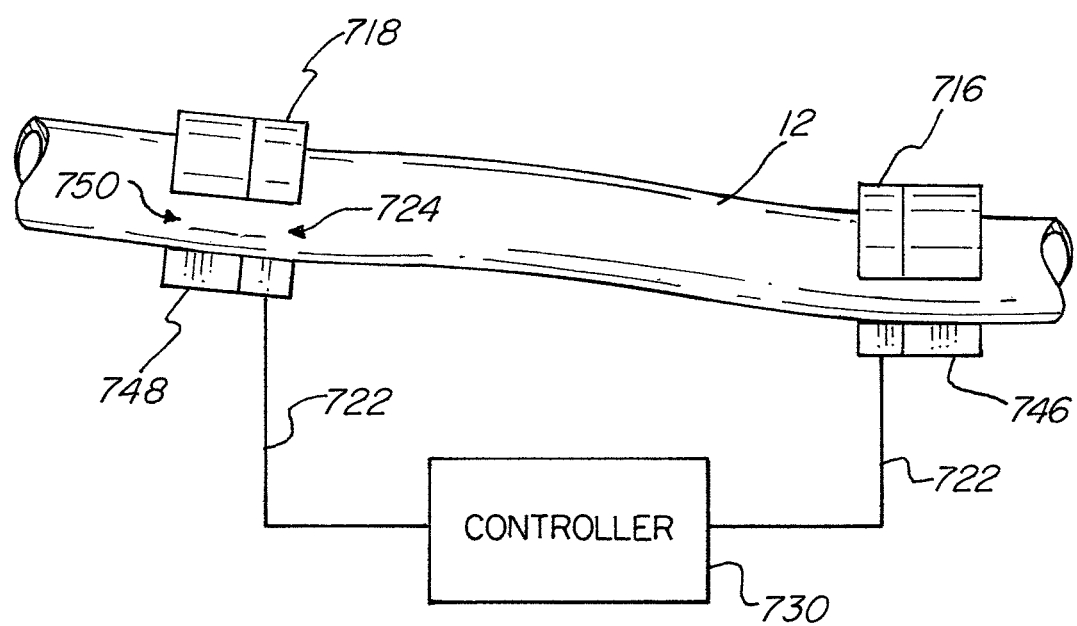
FIG. 10 schematically illustrates an ultrasonic flow meter using a housing or damper.

FIG. 10 schematically illustrates an embodiment of the invention using housings or dampers 746 and 748 adjacent partial ring transducers 716 and 718. The housings or dampers 746 and 748 help to hold the tube 12 and to dampen the ultrasonic energy on the side of the tube 12 on which the fluid flow is not being measured. The tube 12 is inserted through openings 724 and 750 formed in the partial ring transducers 716 and 718 and housings or dampers 746 and 748. Controller 730 is coupled to the partial ring transducers 716 and 718 by wires or conductors 722.

Accordingly it should readily be appreciated that the present invention, by utilizing a partial ring or partial cylinder transducer as well as a split ring or split cylinder transducer makes possible the use of an ultrasonic flow meter with disposable or flexible tubing that can readily and easily be replaced permitting the use of ultrasonic flow meters in application that were previously not possible or practical. One such application is in the medical field where the tubes are usually made disposable. Additionally, by providing a partial ring or cylinder the present invention permits different sizes of flexible tubes to be utilized in a single device and yet permitting relatively good coupling so as to accurately measure fluid flow. If needed, an acoustic coupling material, such as gel or grease, may be applied between the transducer and the tube to achieve improved coupling.

While the present invention has been described with respect to several different embodiments, it will be obvious that various modifications may be made without departing from the spirit and scope of this invention.

What is claimed is:

1. An ultrasonic flow meter for measuring fluid flow in a tube comprising:
   a plurality of partial transducers each having an opening adapted to laterally receive the tube, said plurality of partial transducers being removable from the tube;
   wherein each of the openings in said plurality of partial transducers is less than one hundred eighty degrees of a circumference of each of said plurality of partial transducers; and
   means for controlling said plurality of partial transducers as either a receiver or transmitter for transmitting or receiving an ultrasonic wave,
   whereby fluid flow within the tube may be measured based on a transit time of the ultrasonic wave in a fluid within the tube.

2. An ultrasonic flow meter for measuring fluid flow in a tube as in claim 1 wherein:
   said plurality of partial transducers are each a partial ring.

3. An ultrasonic flow meter for measuring fluid flow in a tube as in claim 2 wherein:
   the partial rings are operated in a radial mode.

4. An ultrasonic flow meter for measuring fluid flow in a tube as in claim 1 wherein:
   said plurality of partial transducers are each a partial cylinder.

5. An ultrasonic flow meter for measuring fluid flow in a tube as in claim 4 wherein:
   the partial cylinders are operated in an axial mode.

6. An ultrasonic flow meter for measuring fluid flow in a tube as in claim 1 wherein:
   each of the openings in said plurality of partial transducers is substantially ninety degrees of a circumference of each of said plurality of partial transducers.

7. An ultrasonic flow meter for measuring fluid flow in a tube as in claim 1 wherein:
   the ultrasonic wave has a wavelength greater than an inside diameter of the tube.

8. An ultrasonic flow meter for measuring fluid flow in a tube comprising:
   a plurality of partial transducers each having an opening adapted to laterally receive the tube;
   a dampener having an opening adapted to laterally receive the tube placed adjacent at least two of said plurality of partial transducers; and
   means for controlling said plurality of partial transducers as either a receiver or transmitter for transmitting or receiving an ultrasonic wave,
   whereby fluid flow within the tube may be measured based on a transit time of the ultrasonic wave in a fluid within the tube.

9. An ultrasonic flow meter for measuring fluid flow in a tube comprising:
   a plurality of split transducers adapted to hold the tube when placed together, said plurality of split transducers being removable from the tube; and
   means for driving said plurality of split transducers as either a receiver or transmitter for transmitting or receiving an ultrasonic wave, wherein the ultrasonic wave has a wavelength greater than an inside diameter of the tube,
   whereby fluid flow within the tube may be measured based on a transit time of the ultrasonic wave in a fluid within the tube.

10. An ultrasonic flow meter for measuring fluid flow in a tube as in claim 9 wherein:
    said plurality of split transducers are each a split ring.

11. An ultrasonic flow meter for measuring fluid flow in a tube as in claim 10 wherein:
    the split rings are operated in a radial mode.

12. An ultrasonic flow meter for measuring fluid flow in a tube as in claim 9 wherein:
    said plurality of split transducers are each a split cylinder.

13. An ultrasonic flow meter for measuring fluid flow in a tube as in claim 12 wherein:
    the split cylinders are operated in an axial mode.

14. An ultrasonic flow meter for measuring fluid flow in a tube comprising:
    a plurality of split transducers adapted to hold the tube when placed together;
    a split dampener adapted to hold the tube when placed together, said split dampener placed adjacent at least two of said plurality of split transducers; and
    means for driving said plurality of split transducers as either a receiver or transmitter for transmitting or receiving an ultrasonic wave,
    whereby fluid flow within the tube may be measured based on a transit time of the ultrasonic wave in a fluid within the tube.

15. An ultrasonic flow meter for measuring fluid flow in a tube as in claim 9 wherein:
    each of said plurality of split transducers is formed from two parts.

16. An ultrasonic flow meter for measuring fluid flow in a tube comprising:
    a plurality of partial transducers each having an opening adapted to laterally receive the tube;
    a movable tube support placed adjacent the opening in each of said plurality of partial transducers, whereby said movable tube support improves ultrasonic coupling between the tube and said plurality of partial transducers; and
    means for driving said plurality of partial transducers as either a receiver or transmitter for transmitting or receiving an ultrasonic wave, whereby fluid flow within the tube may be measured based on a transit time of the ultrasonic wave in a fluid within the tube.

17. An ultrasonic flow meter for measuring fluid flow in a tube as in claim 16 wherein each of said movable tube supports comprises:
- a housing adapted to hold one of said plurality of partial transducers;
- a tube support;
- a handle attached to said tube support; and
- a spring hinge attached between said tube support and said handle, whereby said tube support can be placed within the opening and a predetermined amount of pressure applied to the tube.

* * * * *